United States Patent [19]

Straub

[11] Patent Number: 5,286,155
[45] Date of Patent: Feb. 15, 1994

[54] LOADING APPARATUS FOR A CONVEYING PIPE

[75] Inventor: Paul Straub, Oberuzwil, Switzerland
[73] Assignee: Bühler AG, Uzwil, Switzerland
[21] Appl. No.: 901,542
[22] Filed: Jun. 19, 1992

[30] Foreign Application Priority Data

Jul. 9, 1991 [CH] Switzerland ............... 02037/91

[51] Int. Cl.⁵ ................................ B63B 27/00
[52] U.S. Cl. ...................... 414/139.4; 222/494
[58] Field of Search .......... 414/291, 143.1, 141.8, 414/299, 293, 502; 193/21; 198/532; 222/491, 494, 496, , 564

[56] References Cited

U.S. PATENT DOCUMENTS

| | | | |
|---|---|---|---|
| 2,651,423 | 9/1953 | Rose et al. | 414/141.8 |
| 4,270,671 | 6/1981 | Arnold | |
| 4,390,090 | 6/1983 | Kossebau | 222/564 |
| 4,410,076 | 10/1983 | West et al. | 193/32 |

FOREIGN PATENT DOCUMENTS

| | | | |
|---|---|---|---|
| 0344085 | 12/1989 | Australia | 414/141.8 |
| 2627535 | 6/1987 | Fed. Rep. of Germany | |
| 0108165 | 4/1925 | Switzerland | 222/502 |
| 1504172 | 8/1989 | U.S.S.R. | 414/299 |

*Primary Examiner*—David H. Bollinger
*Assistant Examiner*—Carol Wallace
*Attorney, Agent, or Firm*—Martin A. Farber

[57] ABSTRACT

A loading apparatus is suggested in which the bulk material is slowed down and where it accumulates before flowing out. When the amount of the bulk material inside the loading apparatus exceeds a certain weight, the loading apparatus will open and allow the bulk material to flow out in downward direction. The opening of the loading apparatus is caused merely by the influence of the weight, with any influence exerted by kinetic energy being excluded.

12 Claims, 4 Drawing Sheets

LOADING APPARATUS FOR A CONVEYING PIPE

FIELD OF THE INVENTION

The invention relates to a loading apparatus for a conveying pipe conveying bulk materials for suppressing emission of dust and loss of material, comprising a connecting piece for the conveying pipe, a tubular inlet piece leading into a retaining space, a shutter unit being under the influence of a force exerted by a biasing installation and a discharge opening.

Bulk materials, in particular grain, while being or for being transported, frequently have to be unloaded and reloaded from one receptacle into another, from one means of transportation such as vessels, railroad cars, containers and the like, into another means of transportation. During this operation, the gravity of the bulk material itself or pneumatic energy is utilized in most cases, with the bulk material flowing from a first into a second receptacle by means of a conveying pipe. When being discharged from such a conveying pipe without any precautions, the bulk material often falls into the receptacle with considerable speed and in the form of an irregular flow. When proceeding in such a manner, there will mostly be produced an enormous amount of dust. This represents an undesired effect since-besides the air being impaired-considerable losses of material will result in certain cases.

In order to prevent the above-mentioned emission of dust, various devices are known, which are mounted at the end of the conveying pipe. The patent specifications U.S. Pat. Nos. 4,410,076, 4,390,090 and DE 26 27 535 all describe a loading apparatus rigidly fixed at the end of the conveying pipe, in which loading apparatus the inflowing bulk material accumulates until there is a certain amount of bulk material within this loading apparatus. Flap-like shutters at the outlet of the loading apparatus will open as soon as a certain amount, a certain weight of bulk material, has amassed in the loading apparatus, whereby the discharge of the contents of the loading apparatus will be initiated. By different mechanisms, such as springs, counterweights, and the like, these flap-like shutters are held in a closed position in a prestressed state, until a certain force, i.e., a certain weight of the bulk material, exceeds the biasing force, which urges the shutters to open. However, the conveying speed of the bulk material also acts as a force upon the shutters when the bulk material impinges on the loading apparatus, thereby enhancing the effect of the bulk material already amassed. This may cause an uncontrolled opening of the shutters. To diminish this effect, the patent specification U.S. Pat. No. 4,390,090 suggests one or two impact surfaces in the form of a cylindrically-shaped installation above the discharge shutter, as well as a rotatable butterfly valve reaching above part of the cross-section of the loading apparatus. Holes, such as in a wide-meshed sieve, in the cylindrically-shaped installation slow down the flow of the bulk material. However, when falling into the cylindrical installation with an outlet cone, some materials tend to compacting, so that discharge may be rendered more difficult or even become impossible.

In the case of DE 26 27 535 no such installations are suggested, on the other hand, the discharge shutter is additionally provided with a vibration damper, which cushions intermittent charges of the shutter caused by the irregular flow of bulk material. All these installations are capable of absorbing part of the momentum of the flow of bulk material, thereby somewhat diminishing the emission of dust. But, as in the case of U.S. Pat. No. 4,390,090, it will still remain dependent upon the conveying height and the conveying speed as well as upon the kind of bulk material.

SUMMARY OF THE INVENTION

It is an object of the present invention to provide an end part of a conveying pipe for the conveyance of bulk materials, that is, a head for such a conveying pipe, which—independently of the momentum and the kind of the bulk material conveyed—enables it to flow out in a regular way, so that the undesired emission of dust will be prevented as far as possible. This object is achieved by linking the connecting piece via a hinge to the loading apparatus in such a manner that the loading apparatus—independently of the position of the conveying pipe—always takes up an almost vertical position, and/or that the shutter unit is preceded by at least one substantially flat impact surface, not forming a closed compartment end, thus being open, for slowing down the flow of the flow of the bulk material discharged by the conveying pipe. By pivotally connecting the connecting piece of the loading apparatus to the conveying pipe, which is mostly designed in a slanting position, these two parts will form an angle, so that the bulk material falling down is prevented from directly falling upon the shutter unit prestressed by means of a biasing device. In this way, the shutter unit will no longer be influenced by the kinetic energy. The same thing happens when—as preferred—at least one impact surface, as defined above, is provided on the loading apparatus.

By designing the loading apparatus in such a manner that the shutter unit itself delimits the retaining space, the construction will be simplified, since in this way the shutter unit simultaneously forms the receptacle walls for the retaining space.

By prestressing the biasing unit in such a manner that when the possibly adjustable weight of the bulk material within the retaining space exceeds the biasing force, the shutter unit will move downwardly, thus clearing the discharge opening, a certain damping period will be assured, during which any possible dust may be allowed to settle, before the weight of the amassed bulk material is big enough to urge the loading apparatus into an open position. When using an arrangement in which, together with the tubular inlet piece, a guide unit heading downward with a stopping device is provided, and by designing the shutter unit with a guide flange being movable along the guide unit, with a compression spring device being built-in between the stop and the guide flange, the embodiment will be more compact and operationally reliable than it would be the case when utilizing tension springs; furthermore this will assure a good guidance.

The curving or buckling, of the tubular inlet piece represents a further measure for slowing down the bulk material before its entrance into the retaining space.

BRIEF DESCRIPTION OF THE DRAWINGS

Other characteristics of the invention will result from the description of a number of embodiments schematically shown in the drawings, in which.

DETAILED DESCRIPTION OF THE DRAWINGS

Figure 1:
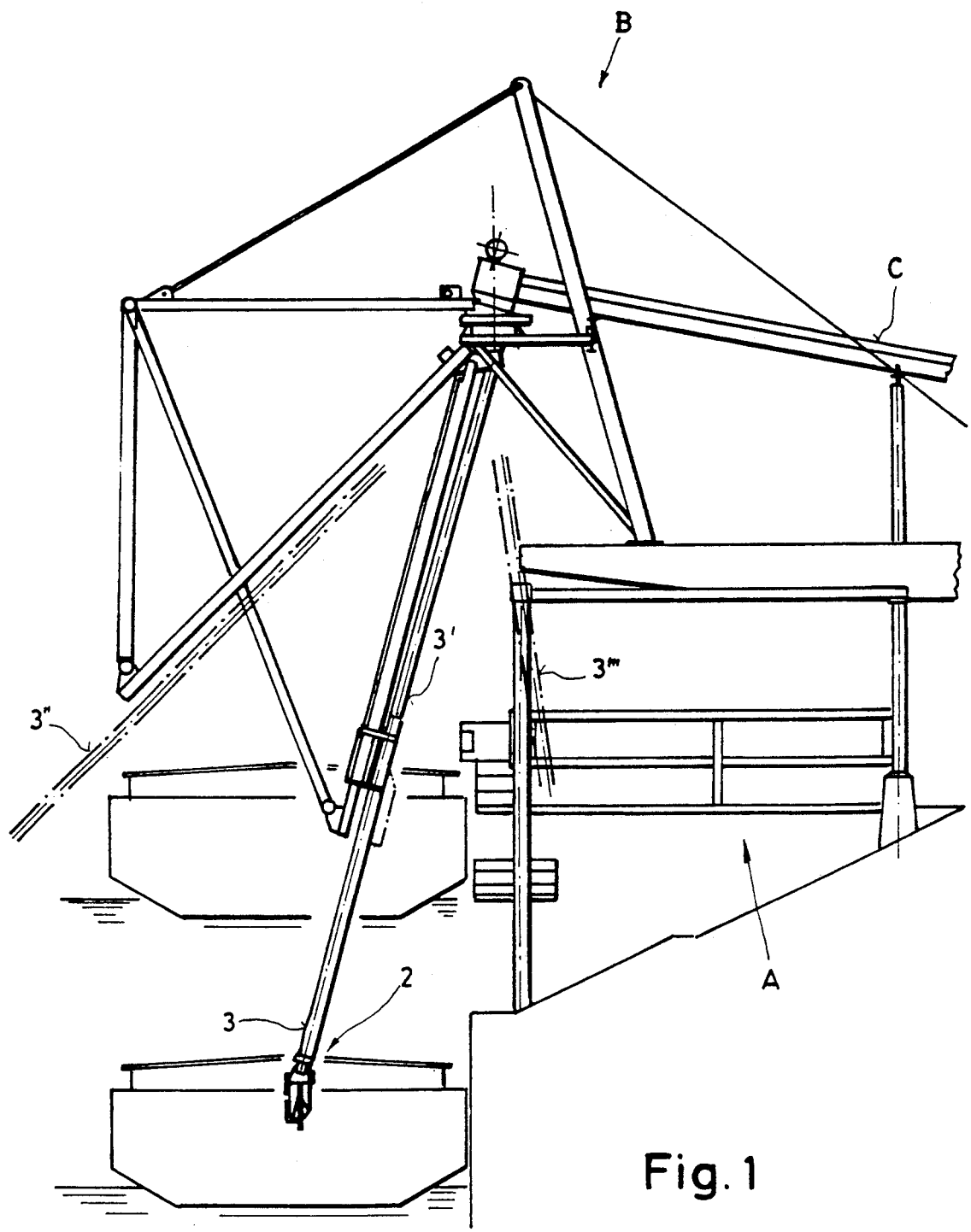
FIG. 1 shows a loading installation for bulk materials for loading vessels.

FIG. 1 shows a loading installation for bulk material, which is conveyed pneumatically or by other means, with the arrangement of a customary conveying pipe 3' when loading a ship during high water, and the arrangement of a conveying pipe 3 with a loading apparatus as provided by the invention when loading a ship during low water. On a quay A, there is a crane-shaped suspension B. On the crane-shaped suspension B there is, on the one hand, a supply line C for a pneumatically conveyed bulk material, on the other hand, there is shown a conveying pipe 3 in continuation of supply line C. The conveying pipe 3 can be pivoted into various positions so as to be capable of filling receptacles (shown here as cross-sections of ships) in various positions. In one position, the conveying pipe 3 is represented as a customary conveying pipe 3' while loading a ship during high water. In another position, it is illustrated as conveying pipe 3" in a wide unloading position, and as conveying pipe 3''' at standstill position. In the position as conveying pipe 3, for loading a ship during low water, it is provided at its lower end with a loading apparatus 1 in accordance with the present invention, which is pivotally connected to the actual conveying pipe 3 by means of hinges 2. The hinges 2 enable the loading apparatus 1—irrespective of its position or the unloading position of the conveying pipe 3—to be always in a vertical position. The bulk material is conveyed from a storage space (not shown) through supply line C, which, e.g., is designed as a pipe with a pneumatic conveyance or as a channel with a conveyance by some form of conveyer belt, to the upper end, and thereupon, through conveying pipe 3, to loading apparatus 1. In the loading apparatus 1 the inflowing bulk material then accumulates until a desired weight has been amassed, whereupon the loading apparatus opens downwardly, which allows the bulk material to be discharged in a regular fashion and without any emission of dust. Due to the specific angle nearly always formed between conveying pipe 3 and the suspended loading apparatus 1, the momentum may be softened already by the impact onto the walls of the loading apparatus to such an extent that it does not influence the opening of the lower shutter of loading apparatus 1 any longer, but that this opening rather takes place solely in dependency upon the weight.

The connecting piece 4 consists of a connecting flange 5, a holding device for the two lateral pivot bearings 2 and a central tubular piece. The connecting piece 4 is connected via pivot bearing 2 to the mid-portion 7 of the loading apparatus, carrying the same. In the mid-section, there are provided the pivot bearings 2 in holding devices 8. At its upper end, the mid-section consists of a buckled tubular piece 9 on whose sides there are mounted the holding devices 8. On a first flange 10, the tubular piece 9 is provided with a rubber bellows, which is preferably annular in shape, but, if necessary, it may also be adapted to an angular flange. In a favorable embodiment, as shown, a simple elastic plate 11 is used, whereas on a second flange 12, there are mounted connecting pieces 13 and 14 to a movable shutter unit 21. The rubber bellows or plate 11 ensures a dustfree connection of the tubular piece 9 of mid-section 7 to the tubular piece 6 of the connecting piece 4 according to the specific alignments of conveying pipe 3 (cf. the dash-dotted connecting piece).

A connecting piece 15 rigidly linking a central tubular piece 16 to tubular piece 9 starts going laterally away from tubular piece 9 of mid-section 7. On the bent upper outline of connecting piece 15, there is an impact surface 17 open to the arriving bulk material and not curved to form a compartment. Preferably, its upper boundary line will be a segment of a circle or, if desired, a straight line, of tubular piece 9, and its lower boundary line is designed as a circumferential portion of a pipe 16, so that the latter is covered on its whole surface by the impact surface 17. The impact surface 17 is situated opposite the discharging hole of conveying pipe 3, or of the connecting piece 4, respectively, so that the momentum of the bulk material falling down is cushioned and is no longer able to influence the opening of the loading apparatus in a manner described hereafter. In principle, when using an arrangement with an oblique position of the conveying pipe, such an impact surface might also be created when the bulk material falls onto the wall surrounding the retaining space since, in most operational cases, there will be formed an angle by hinge 2 between the longitudinal axis of conveying pipe 3 and that one of the loading apparatus 1 lying below it.

Figure 2:
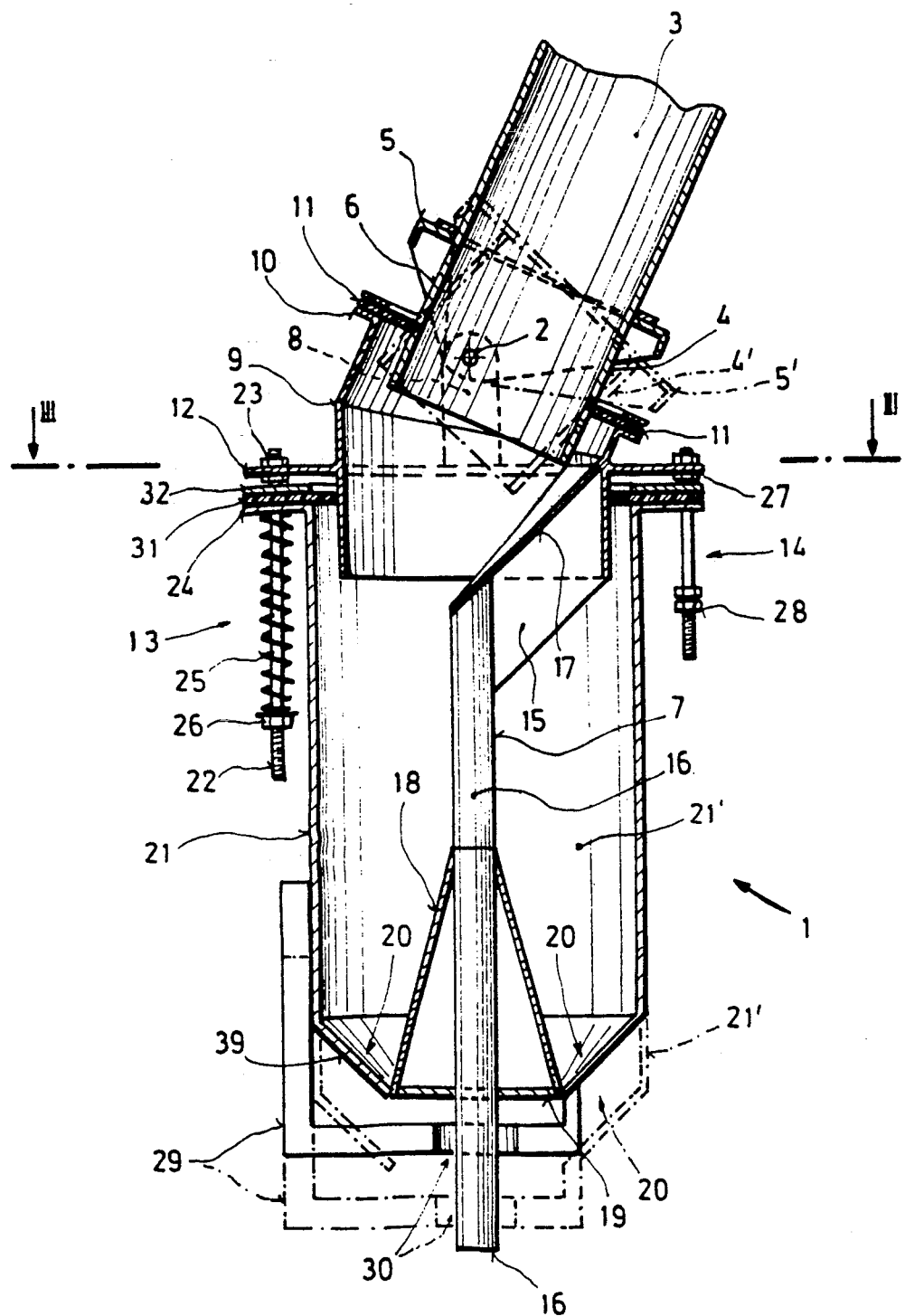
FIG. 2 represents a longitudinal section of a first modification of the loading apparatus as provided by the invention.

FIG. 2 shows a first modification of the loading apparatus as provided by the invention in a longitudinal section. The loading apparatus 1 is pivotally connected to the holding devices 8 by means of a curved, here, e.g., buckled tubular piece 9 and two laterial hinges 2, and is linked by means of a connecting piece 4, 4' to the connecting flange 5, 5' of conveying pipe 3 at its lower end. The holding devices 8 for the hinges 8 are designed as lateral reinforcements of the curved tubular piece 9.

In this arrangement, the dot-dash lined representation of the connecting piece 4' and of the connecting flange 5' shows a farther swung out position. The weight of the loading apparatus 1 pivotally connected to conveying pipe 3 via the hinges 2 continually holds it in a vertical position. A rubber bellows, or, preferably, a flat, flexible plate 11 seals the space between the connecting piece 4 and the curved tubular inlet piece in a similar way as explained with reference to FIG. 1.

Laterally arranged connection pieces 13 connect a flange 12 of the curved tubular piece 9 to the flange 24 of the loading apparatus 1, serving, on the hand, to guide the same, on the other hand, to support compression springs 25, which are more favourable than tension springs acting on the upper side of loading apparatus 1. The connecting pieces 13 consist of threaded rods 22, which, mounted in holes, are fastened to flange 12 of shutter unit 21, leading through holes on flange 24 of shutter unit 21. When using this arrangement, a further rubber bellows, or a further flexible plate, respectively, may serve to seal the space between the curved tubular inlet piece 9 and the shutter unit 21 of loading apparatus 1.

The shutter unit 21 is preferably designed with a round cross-section, so that, at its lower end, it defines a retaining space 21' with a substantially cylindrical cross-section together with the shutter surface 39. However, the cross-section of shutter unit 21 and thus, of the retaining space 21', may also be designed in a polygonal form, e.g., a square form.

Below a flange 24 at the upper end of shutter unit 21, 21', the compression spring units 25 mentioned above are put over the guide rods 22, which are held down by means of fastening devices 26, e.g., by nuts. These spring units 25 are prestressed by the fastening devices 26 in such a manner that the shutter unit 21 exceeds this biasing force only when a predetermined filling weight has been reached, whereupon it moves downwardly. Connecting and guiding units 14, preferably in the form of threaded pins, which are laterally arranged as well, are fixed to flange 12 of the curved tubular piece 9, leading through holes 27 of flange 24 of the loading apparatus 1. The loading apparatus 1 can be shifted in vertical direction on these connecting pieces 14, with stopping devices 28, preferably nuts, limiting its vertical displaceability.

At its lower end, the shutter unit 21 is provided with a shutter surface 39, warped inwardly in downward direction with an inclined plane, particularly a conical surface, facilitating the discharge in order to delimit an outlet opening 20. Midway, alongside loading apparatus 1, there is arranged a tubular piece 16, which is rigidly connected to the curved tubular inlet piece 9 by means of connecting piece 15. At the upper, oblique end of tubular piece 16 and of connecting piece 15, covering these, an impact surface 17 is arranged at right angles to connecting piece 15, which impact surface reaches till the bend of the curved tubular piece 9 on the level of flange 12. This impact surface 17 is thereby downwardly inclined at an angle to flange 12 substantially having the form of a segment of a circle. The tubular piece 16 is surrounded at its lower part, that is, about from its central part downwardly, by a concentric shutter body 18, which—with its basic surface area 19—closes the outlet opening 20 when the shutter unit 21 is in its upper closing position. When using this arrangement, the tubular piece 16 serves as a holder for the cone 18. The basic surface area 19 of the concentric shutter unit has the same form as outlet opening 20 when the shutter unit 21 has moved downwards. When choosing a cylindrical shutter unit, it will be preferred to design the shutter unit as a cone, in the case of a prismatic shutter unit, however, as a pyramide.

The tubular piece 16 reaches beyond the basic surface area 19 of shutter body 18 in downward direction, to be more precise, by at least the length of the maximum displaceability of shutter unit 21, which is delimited by means of the connecting pieces 14 described above with the stopping devices 28. This part of pipe 16 projecting downwardly serves as a concentric guidance for shutter unit 21 by cooperating with at least one L-shaped holder 29, which is rigidly mounted with one of its legs on the lateral outside of shutter unit 21, whereas its other leg surrounds the pipe 16 guided in an opening 30. Due to this concentric guidance of shutter unit 21 by the pipe 16, there will be guaranteed a complete closing of outlet opening 20 by the basic surface area 19 of shutter body 18 in the upper position of shutter unit 21. Analogously, the outlet opening 20 remains concentrically open also in the lower position.

The loading apparatus 1, which is kept in a swiveling position by its own weight with the help of the hinges 2, always remains in a vertical position, independently of the slope of conveying pipe 3. When bulk material is conveyed to loading apparatus 1 via conveying pipe 3, it reaches the connecting piece 4, and, in the case of a marked slope of conveying pipe 3, it impinges on the impact surface 17, whereupon it falls into retaining space 21' of loading apparatus 1. In the case of a low slope of conveying pipe 3, the bulk material bounds against the wall of the curved tubular piece 9. In this arrangement, the bulk material is slowed down by the impact surface 17 and/or the wall of the curved tubular piece 9. Thereafter, the bulk material falls into the retaining space 21' of loading apparatus 1.

In the retaining space itself any emission of dust will thus be prevented. The shutter unit 21 is in its upper position, in which its outlet opening 20 is sealed by the base of shutter body 19. Thereupon, the bulk material accumulates in retaining space 21', until the weight of the bulk material exceeds the biasing force of the springs 25. As a result, the shutter unit 21 shifts along pipe 16 in downward direction and the outlet opening 20 is opened. Now, the bulk material, merely driven by its own gravity, is allowed to flow out downwardly. As soon as the weight of the bulk material within retaining space 21' no longer exceeds the biasing force of the springs 25, the springs press the shutter unit upwardly, whereby the opening 20 is closed again.

Figure 3:
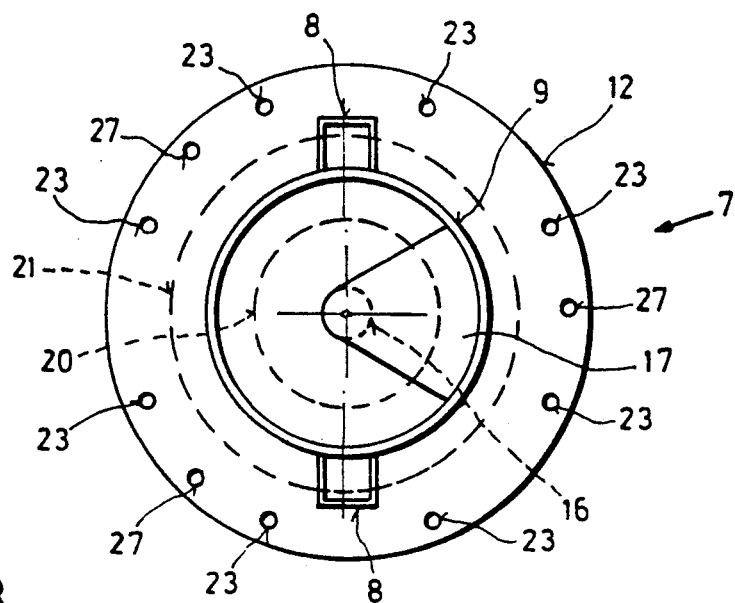
FIG. 3 illustrates the same loading apparatus in a cross-sectional view.

FIG. 3 shows the loading apparatus in the cross-section III—III of FIG. 2 on the level of flange 12. The holes 23, 27 for the connecting pieces 13, 14 are concentrically arranged on flange 12. The curved tubular inlet piece 9 with the two lateral holders 8 for the hinges 2 and the tubular piece 16 are positioned in a concentric way towards the interior. The impact surface 17 substantially shaped as segment of a circle covers the tubular piece 16, linking this to the wall of the curved tubular piece 9, with a certain part of the interior cross-section of the curved pipe being covered. When using this arrangement, the impact surface 17 is situated approximately at right angles to the holders 8 for the hinges 2. The retaining space 21' and its outlet opening 20 is represented in dot-dashed lines.

Figure 4:
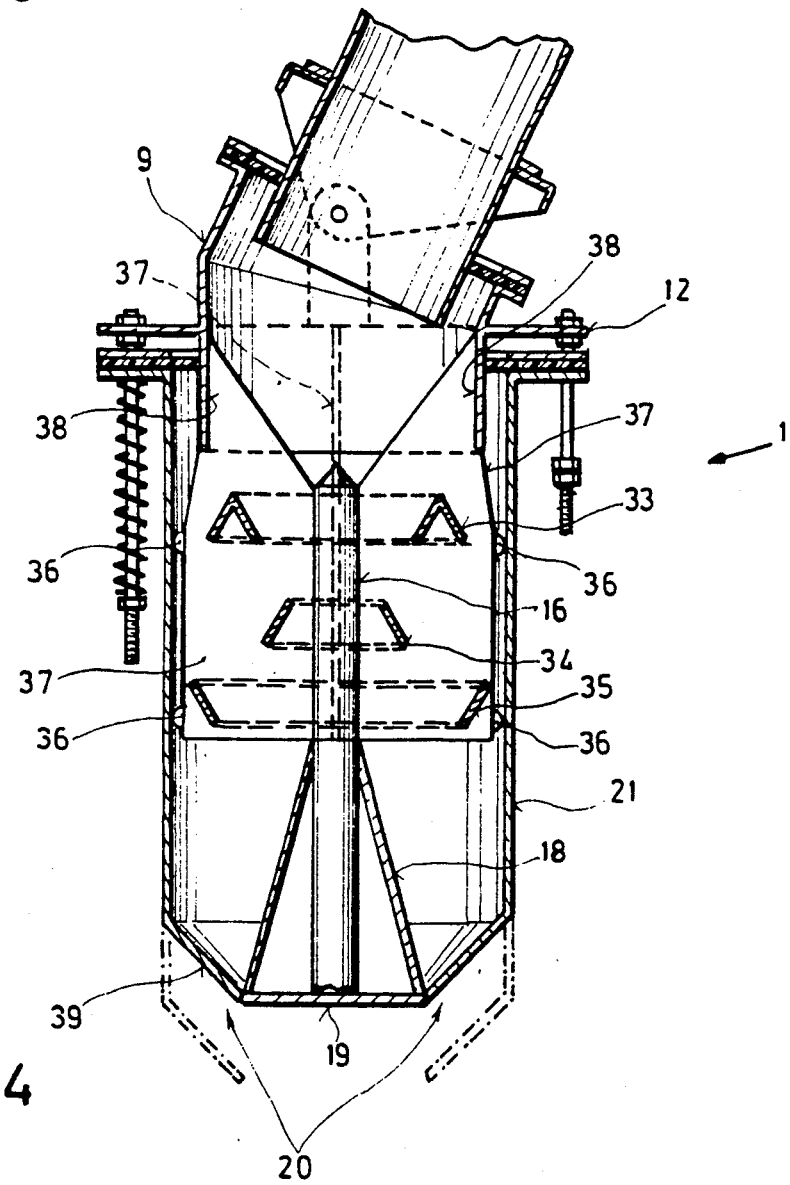
FIG. 4 shows a loading apparatus in accordance with the teachings of the invention in a further embodiment with additional baffle plates or deflector surfaces.

FIG. 4 shows a further modification of the loading apparatus. This modification differs from the one according to FIG. 2 by the arrangement of a plurality of different impact surfaces inside the shutter unit 21. For this reason, only the characteristic features of this embodiment will be described. Guide walls 37 are rigidly linked to the curved tubular inlet piece 9. These guide walls 37 project from about the level of flange 12 at the curved tubular inlet piece 9 downwardly into shutter unit 21. In this arrangement, they are also rigidly fastened to tubular piece 16. The shutter unit 21 is mounted, via annularly arranged guide units 36, around these guide walls 37 and pipe 16 in a concentrical way. As in the previous embodiment, the shutter unit 21 shifts downwardly or upwardly, according to the weight of the amassed bulk material, in order to clear outlet opening 20 from the base of shutter body 18, and to open and close it again. The guide units 36 are designed as gliding or rolling units providing for a concentric guidance of shutter unit 21 with respect to the tubular mid-section 7. In the tubular mid-section 17, there is at least one guide wall 37, which diametrically divides the cross-section of the tubular mid-section 7, projecting at its upper end into curved pipe 9 up to about the level of flange 12. In a preferred arrangement, two such guide walls 37 are installed, for example positioned at right angles to each other, thereby dividing the cross-section of the tubular mid-section into four equal partial cross-sections. These guide walls 37, on the one hand, serve to canalize the bulk material falling down, on the other hand, they represent the rigid connection between the curved tubular inlet piece 9 and pipe 16 to shutter body 18. Impact surfaces 33, 34 and 35 are mounted in the respective guide wall 37, serving to slow down by deviation the bulk material falling down. These impact surfaces 33, 34 and 35 are annularly arranged around pipe 16, piercing through the guide walls 37 and being held by those guide walls 37. The impact surfaces have the cross-section of an angle section, with the angle directed upwardly. Thus, the impact surfaces 33 deviate the infalling bulk material in outward and inward direction. The impact surfaces 34, 35 are manufactured from flat strip-like profiles and are inclined to one side, inwardly or outwardly, with respect to the shutter unit 21. The impact surfaces direct the bulk material to the outside, the impact surfaces 35 do so to the inside. The impact surfaces 33, 34 and 35 prevent the bulk material conveyed from impinging on the shutter surface 39 at the lower end of the shutter unit 21 in a non-retarded manner. In this way, merely the weight of the bulk material that has accumulated in loading apparatus 1 urges the latter to open by pressing down shutter unit 21, as described in connection with FIG. 2.

Figure 5:
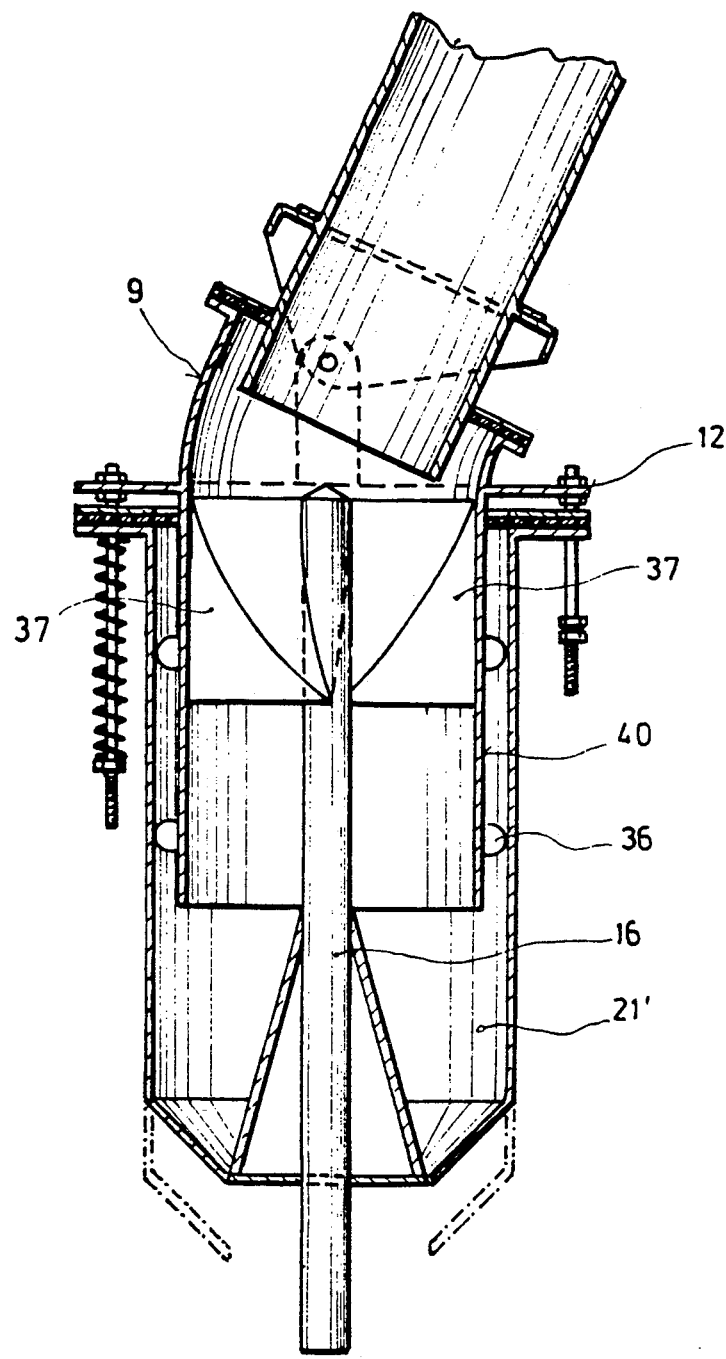
FIG. 5 represents a further embodiment of the loading apparatus as provided by the invention with other chicanes.

FIG. 5 shows a further modification of loading apparatus 1 as provided by the present invention. This embodiment differs from the one according to FIGS. 2 and 4 by a special arrangement of the impact surfaces in the interior of shutter unit 21. For this reason, only the particularities of this embodiment will be described in the following. When using this arrangement, the guide walls described in connection with FIG. 4 are designed in such a manner that they simultaneously serve as impact surfaces. In this arrangement, at least one, but preferably two such guide walls 37 being arranged opposite one another, will be provided. These guide walls 37 are rigidly connected on their outsides to wall 40 of the curved tubular inlet piece 9 being extended in downward direction, and, with their insides, they support the central pipe 16. The guide walls 37 coil helically around central pipe 16 in downward direction, projecting somewhat into retaining space 21', with the helix turning a quarter up to half a rotary revolution. The slope of the helix of the guide walls 37 may be designed as degressing in downward direction. By designing the guide walls 37 in such a manner, they additionally have the function of impact surfaces. These helically arranged guide walls 37 continuously slow down the inflowing bulk material during its fall within loading apparatus 1. Due to this continuous retardation, the emission of dust will turn out still smaller than when using the embodiment described previously, with the dust simultaneously remaining mixed up with the bulk material itself.

It goes without saying that within the scope of the invention numerous modifications will be possible, for example such ones in which the retaining space will be enclosed by a casing separated from the shutter unit and, in particular, being at least partially surrounded by the latter, which casing will support the shutter unit and, if necessary, will also guide it. In such a case, the casing itself may carry the impact surfaces. On the other hand, the construction illustrated by FIG. 2 is considerably lighter and cheaper, with its operational safety nevertheless being guaranteed, so that the embodiment according to FIG. 2 will be preferred.

What is claimed is:

1. A loading apparatus for suppressing emission of dust and loss of material during flow of bulk material from a conveying pipe through said apparatus to a storage area, said apparatus comprising:
    an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;
    shutter means enclosing said end part to define an annular retaining space for retaining said bulk material, said shutter means being movable relative to said end part for allowing and inhibiting flow of bulk material out of said retaining space, said shutter means having a closed position and at least one open position;
    a discharge opening defined by said shutter means and said end part and being located at a lower end of said retaining space;
    biasing means extending between said shutter means and said intermediate member for urging said shutter means with a predetermined biasing force into said closed position against the weight of said bulk material until the weight exceeds said biasing force;
    wherein said tubular-shaped end part flares outward at said lower end of said retaining space for defining said discharge opening.

2. A loading apparatus for suppressing emission of dust and loss of material during flow of bulk material from a conveying pipe through said apparatus to a storage area, said apparatus comprising:
    an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;
    shutter means enclosing said end part to define an annular retaining space for retaining said bulk material, said shutter means being movable relative to said end part for allowing and inhibiting flow of bulk material out of said retaining space, said shutter means having a closed position and at least one open position;
    a discharge opening defined by said shutter means and said end part and being located at a lower end of said retaining space;
    biasing means extending between said shutter means and said intermediate member for urging said shutter means with a predetermined biasing force into said closed position against the weight of said bulk material until the weight exceeds said biasing force;
    wherein said end part comprises first guide means for guiding said shutter means along a straight line, said first guide means being arranged substantially orthogonally to a plane of said discharge opening.

3. A loading apparatus for suppressing emission of dust and loss of material during flow of bulk material from a conveying pipe through said apparatus to a storage area, said apparatus comprising:

an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;

shutter means enclosing said end part to define an annular retaining space for retaining said bulk material, said shutter means being movable relative to said end part for allowing and inhibiting flow of bulk material out of said retaining space, said shutter means having a closed position and at least one open position;

a discharge opening defined by said shutter means and said end part and being located at a lower end of said retaining space;

biasing means extending between said shutter means and said intermediate member for urging said shutter means with a predetermined biasing force into said closed position against the weight of said bulk material until the weight exceeds said biasing force; and first guide means comprising an appendix of said intermediate member located at said end part.

4. Loading apparatus as claimed in claim 3, wherein said appendix is tubular.

5. A loading apparatus for suppressing emission of dust and loss of material during flow of bulk material from a conveying pipe through said apparatus to a storage area, said apparatus comprising:

an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;

shutter means enclosing said end part to define an annular retaining space for retaining said bulk material, said shutter means being movable relative to said end part for allowing and inhibiting flow of bulk material out of said retaining space, said shutter means having a closed position and at least one open position;

a discharge opening defined by said shutter means and said end part and being located at a lower end of said retaining space;

biasing means extending between said shutter means and said intermediate member for urging said shutter means with a predetermined biasing force into said closed position against the weight of said bulk material until the weight exceeds said biasing force;

wherein said tubular-shaped end part flares outward at said lower end of said retaining space for defining and reducing said discharge opening;

said biasing means allowing movement of said shutter means away from said end part when the weight of said bulk material within said retaining space exceeds said predetermined force;

guide means fixed to an upper portion of said intermediate member for guiding said shutter means, said guide means having an upper and a lower stop;

another guide means belonging to said shutter means and being movable along said first-mentioned guide means between said upper stop and said lower stop; and wherein said biasing means includes pressing spring means located in between said lower stop and said another guide means.

6. A loading apparatus for suppressing emission of dust and loss of material during flow of bulk material from a conveying pipe through said apparatus to a storage area, said apparatus comprising:

an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;

shutter means enclosing said end part to define an annular retaining space for retaining said bulk material, said shutter means being movable relative to said end part for allowing and inhibiting flow of bulk material out of said retaining space, said shutter means having a closed position and at least one open position;

a discharge opening defined by said shutter means and said end part and being located at a lower end of said retaining space;

biasing means extending between said shutter means and said intermediate member for urging said shutter means with a pretermined biasing force into said closed position against the weight of said bulk material until the weight exceeds said biasing force; and said joining pipe has a bent pipe axis with an upper and a lower end and an angle in between said pipe axis and a vertical axis which declines from said upper to said lower end.

7. A loading apparatus for suppressing emission of dust and loss of material during flow of bulk material from a conveying pipe through said apparatus to a storage area, said apparatus comprising:

an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;

shutter means enclosing said end part to define an annular retaining space for retaining said bulk material, said shutter means being movable relative to said end part for allowing and inhibiting flow of bulk material out of said retaining space, said shutter means having a closed position and at least one open position;

a discharge opening defined by said shutter means and said end part and being located at a lower end of said retaining space;

biasing means extending between said shutter means and said intermediate member for urging said shutter means with a predetermined biasing force into said closed position against the weight of said bulk material until the weight exceeds said biasing force;

wherein said shutter means further comprises a casing surrounding part of said retaining space and an upper opening within said casing, said upper opening surrounding said joining pipe and allowing a movement of said upper opening along said joining pipe; and said shutter means comprises first movable sealing means located around said upper opening and fitting to said joining pipe.

8. Loading apparatus as claimed in claim 7, wherein said first movable sealing means comprises an elastic plate.

9. A loading apparatus for suppressing emission of dust and loss of material during flow of bulk material from a conveying pipe through said apparatus to a storage area, said apparatus comprising:

connecting means for connecting said conveying pipe to said apparatus;

an intermediate member pivotally connected to said connecting means, said member having a joining pipe for connecting said intermediate member to said connecting means, said joining pipe having an upper joining end and a lower joining end, an intermediate part defining an axis which is oriented substantially vertically independent of the orientation of said conveying pipe, and an end part located at a lower end of said intermediate part;

shutter means enclosing said end part to define an annular retaining space for retaining said bulk material, said shutter means being movable relative to said end part for allowing and inhibiting said flow of bulk material out of said retaining space, said shutter means having a closed position and at least one open position;

a discharge opening defined by said shutter means and said end part and being located at a lower end of said retaining space; and biasing means extending between said shutter means and said intermediate member for urging said shutter means with a predetermined biasing force into said closed position against the weight of said bulk material until the weight exceeds said biasing force; and wherein said joining pipe comprises movable sealing means located at said upper joining end and fitting to said connecting means.

10. Loading apparatus as claimed in claim 9, wherein said second movable sealing means comprises an elastic plate.

11. Loading apparatus according to claim 2, wherein said first guide means and said biasing means are operative to provide a gradual opening of said shutter means against the weight of the bulk material.

12. A loading apparatus for suppressing emission of dust and loss of material during flow of bulk material from a conveying pipe through said apparatus to a storage area, said apparatus comprising:

an intermediate member connected to said conveying pipe, said member having an upper part comprising a joining pipe connected to said conveying pipe, an intermediate part with at least one open deflector surface for retarding the speed of said flow of said bulk material from said conveying pipe, and an end part extending downward from said intermediate part, a portion of said end part having a tubular shape;

shutter means enclosing said end part to define an annular retaining space for retaining said bulk material, said shutter means being movable relative to said end part for allowing and inhibiting flow of bulk material out of said retaining space, said shutter means having a closed position and at least one open position;

a discharge opening defined by said shutter means and said end part and being located at a lower end of said retaining space;

biasing means extending between said shutter means and said intermediate member for urging said shutter means with a predetermined biasing force into said closed position against the weight of said bulk material until the weight exceeds said biasing force; and wherein a lower end of said shutter means flares inwardly toward said tubular-shaped end part at said lower end of said retaining space for supporting said bulk material and for defining said discharge opening.

* * * * *